B. HAUSHEER.
METHOD OF SOLDERING CAPS TO CANS.
APPLICATION FILED JULY 27, 1912.

1,105,778.

Patented Aug. 4, 1914.

Witnesses:
S. A. Jarvis
George G. Measures.

Inventor:
Bernard Hausheer
by Walter D. Amount
attorney.

UNITED STATES PATENT OFFICE.

BERNARD HAUSHEER, OF NORWICH, NEW YORK, ASSIGNOR TO BORDEN'S CONDENSED MILK COMPANY, OF NEW YORK, N. Y., A CORPORATION OF NEW JERSEY.

METHOD OF SOLDERING CAPS TO CANS.

1,105,778.  Specification of Letters Patent.  Patented Aug. 4, 1914.

Application filed July 27, 1912. Serial No. 711,775.

*To all whom it may concern:*

Be it known that I, BERNARD HAUSHEER, a citizen of the United States, and a resident of Norwich, in the county of Chenango and State of New York, have invented a certain new and useful Method of Soldering Caps to Cans, of which the following is a specification.

My present invention relates to the soldering of metallic caps to metallic cans, to hermetically seal the latter, whereby their contents, such as condensed milk for example, are therein retained, and protected against invasion by undesired bacteria, dirt, etc.

The objects of my invention comprise production of more uniformly air-tight and perfect seams with greater speed and with less consumption, or waste, of solder than heretofore, also saving in wear of machinery. I attain these objects by my method as hereinafter described and as applied by aid of the means illustrated in the accompanying drawings, in which—

Figure 2:
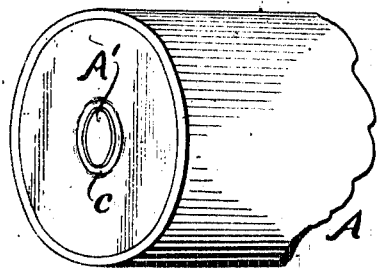
Figure 1:
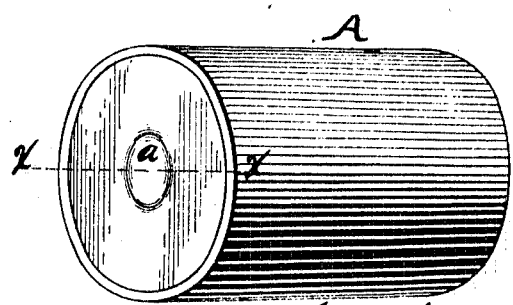
Figure 3:
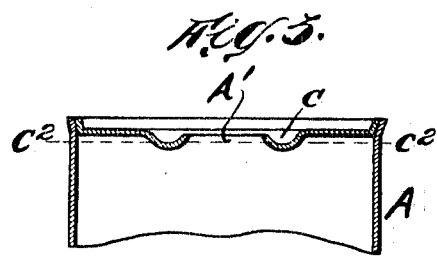
Figure 5:
Figure 7:
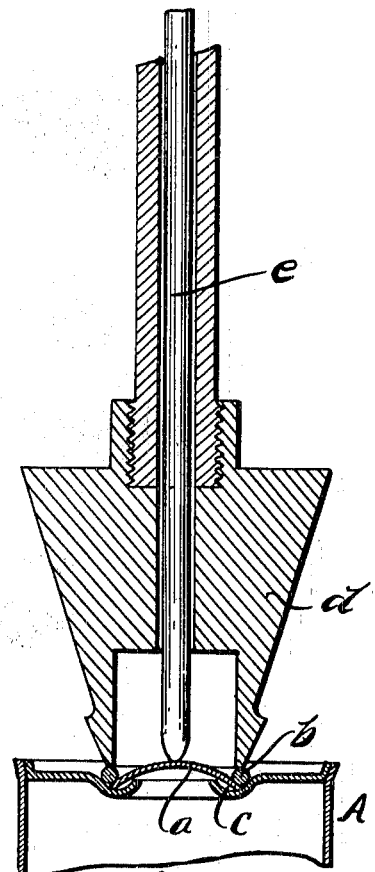
Figure 6:
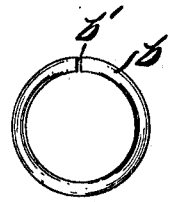

Figure 1 is a perspective view of a filled can the cap of which has been soldered on by my method; Fig. 2 is a perspective view of the end containing the opening of said can prior to placing and soldering the cap thereon; Fig. 3 is a vertical central sectional view of part of Fig. 2, the can top being shown as when the can is in vertical position; Fig. 4 is a top plan perspective view of the cap isolated; Fig. 5 is a central transverse sectional view taken on the dotted line $y$—$y$ of Fig. 4; Fig. 6 is a perspective view of one of my novel ring-shaped solders; Fig. 7 is a central vertical sectional view of the can, cap, and ring-shaped solder, including also a diagrammatic and partly central sectional view of parts of devices utilizable to melt and iron the solder.

Referring to the drawings, A represents a usual type of cylindrical tin can, provided in its top with a therewith concentric circular opening A'.

I practice my said method as follows: Having ascertained the diameter of the endless circular joint to be formed by soldering, this joint being equal to the diameter of the circular cap $a$ measured at its edge $a'$ on the dotted line $a^2$—$a^2$ (Fig. 5), I produce in any convenient manner a ring-shaped unitary piece of solder $b$ (Figs. 6 and 7) the diameter of which taken at the center of the material constituting such ring is substantially equal to the aforesaid diameter of the cap. Said ring is solid, composed of solder wire of substantially circular cross-section as shown in Fig. 7. I have contrived mechanical means for automatically producing such ring-shaped pieces of solder with requisite uniformity and economy on industrial scales, which means I do not claim or show herein, these being the subject of my co-pending application, Serial Number 697,139, filed May 14, 1912, it being understood that my present invention is not dependent on the means, or manner, of producing my said ring-shaped pieces of solder.

My procedure enables a diameter, or gage, of solder wire to be selected which will afford, as nearly as possible, only the exact amount of solder required to make a tight seam of the particular size and style of joint desired in any particular case. It will also be understood that it is not essential that my said ring should be absolutely continuous, or endless, a slightly open joint as at $b'$ (Fig. 6) being permissible, since the flow of the solder, in melting down, closes the joint at once without undesirable movements of the solder.

It is important to insure immersion of the joint in the solder bath resulting from the hereinafter described melting of said ring. This I accomplish by taking advantage of the usual flange surrounding the edge of the can opening. I take care to produce this flange in such form as to impart to the top of the can, a continuous, or endless, therewith concentric, circular trough $c$ of uniform cross-section, and of capacity sufficient not only to receive and support therein all of the edge of the cap, but also to retain therein the flux, and also solder resulting from the melting of the ring. The bottom of said trough should be as nearly as possible in a single plane and, when the can is set up, on the level as indicated by the dotted line $c^2$—$c^2$ of Fig. 3.

To the usually continuous or endless circular edge of the concavo-convex cap $a$ I, preferably, impart such contour as to enable it to support the cap on the level, *i. e.* on substantially a single horizontal plane as indicated by the dotted lines $a^2$—$a^2$ in Fig. 5. It will be understood that otherwise the cap may be of any preferred shape.

The parts being preliminarily prepared as aforesaid in the practice of my method, my next step is, by any convenient means, to support and hold the can so disposed as to have its said trough level and opening upwardly as shown in Figs. 3 and 7. This done, the cap *a* is manually or otherwise deposited upon the can so as to cover its opening, the supporting edge of the cap being disposed within, and upheld by, said trough, as shown in Fig. 7. I next deposit my cold, *i. e.* solid, solder ring so that it rests unattached upon the can or cap or both, being throughout over, or in close proximity to, the open seam between the surface of the trough and the thereby supported cap edge. To the parts thus assembled is supplied sufficient flux as usual.

My next step is to melt the solder ring as preliminary to ironing. To accomplish this any convenient means may be employed but as it is preferable that my ring of solder should be melted as nearly simultaneously throughout as possible, I prefer to employ the well known form of rotatable cylindrical soldering-iron *d* indicated diagrammatically in central vertical section in Fig. 7 combined with the usual centering and cap-holding rod *e*. The iron *d* and rod *e* being supported as usual above the can, the latter with its as above described assembled cap, ring, and flux is centered under the iron. The holding rod is then, as usual, lowered to bear upon the cap which it holds down in position as shown in Fig. 7. This done the iron sufficiently heated as usual is lowered sufficiently to enable the heat thereby supplied to melt the solder. After the solder has melted I pause in the operation sufficiently to enable the gases, etc., from the flux to rise out of the body of the solder. This done, the iron is still further lowered until it contacts the molten solder and the iron is then rotated around its vertical axis until the solder has been sufficiently ironed, at a plurality of points simultaneously, as is essential to produce a seam having the superior qualities which it is the object of my invention to attain.

I am aware that prior to my present invention the use of preliminarily prepared rings of solder has been suggested, and I do not wish to be understood as broadly claiming anything thus previously disclosed, the which, I believe, to be clearly differentiable from, if not inferior to, my said method as a novel combination of steps in procedure. For example, the detached ring, or washer, of solder shown in U. S. Patent to Morris, No. 140,840, is not like mine of solid and circular cross section, but is composed of a plurality of inter-twisted strands of solder wire, and it is not ironed after being allowed to stand for an interval after melting. The ring of solder disclosed by Norton's Patent No. 364,663 is likewise not, like mine, of solid circular cross section, but is of V shape and is moreover, unlike mine, preliminarily soldered to the cap apart from the can, nor does Norton describe ironing nor my pause after melting of the solder before ironing it. Though use of a solid ring of solder of presumably circular cross section is disclosed in Brooks U. S. Patent No. 931,262, this also omits my step of ironing the molten solder, and allowing it to stand molten on the level for an interval before so ironing.

Experience has demonstrated to me that none of the hitherto disclosed methods of employing preliminarily prepared solder rings are able to attain the good results of my present method because failing to conform to the latter in the combination of details of shape and procedure above described as characterizing my present invention.

What I claim as new and desire to secure by Letters Patent is the following, viz:—

The method of soldering caps to cans which comprises assembling and supporting adjacent the joint between them unmolten solder and flux, melting said solder by approximating thereto without contacting therewith a source of heat, supporting the resulting bath so that said joint is immersed thereby, and maintaining it undisturbed by mechanical agitation until resulting gases have risen out of it, and finally ironing it at a plurality of points simultaneously until the joint is soldered.

BERNARD HAUSHEER.

Witnesses:
 DAVID F. LEE,
 JOHN F. LEE.